Nov. 5, 1935.  C. F. TRUSWELL  2,020,088
UNIVERSAL SWIVELED COUPLING FOR ELECTRICAL CONDUCTORS
Filed March 20, 1934   2 Sheets-Sheet 1
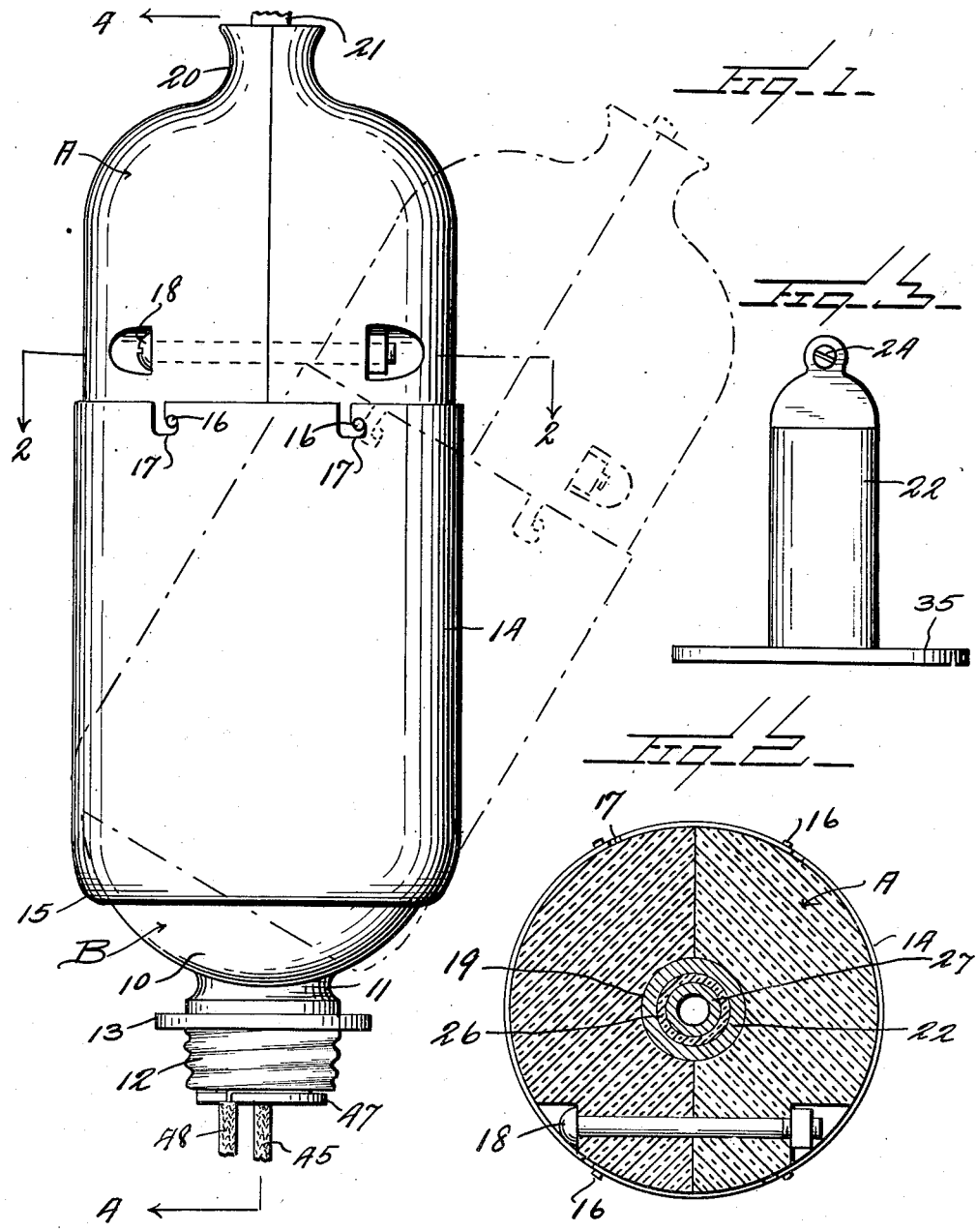
Inventor
C. F. Truswell
By Watson E. Coleman
Attorney Nov. 5, 1935.  C. F. TRUSWELL  2,020,088
UNIVERSAL SWIVELED COUPLING FOR ELECTRICAL CONDUCTORS
Filed March 20, 1934   2 Sheets-Sheet 2
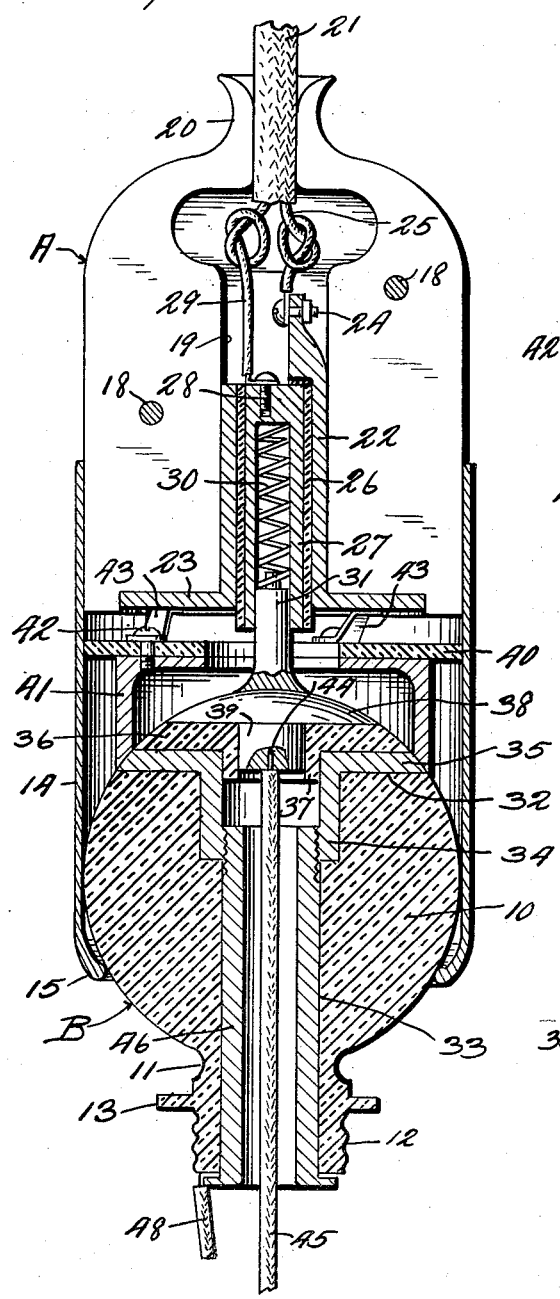
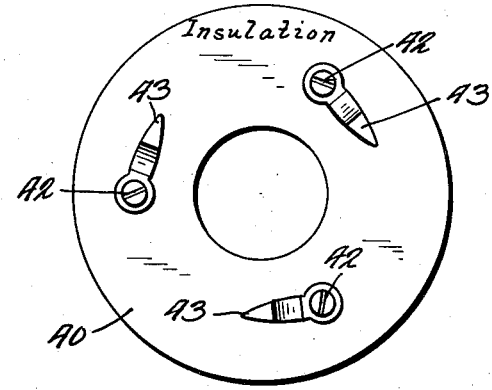
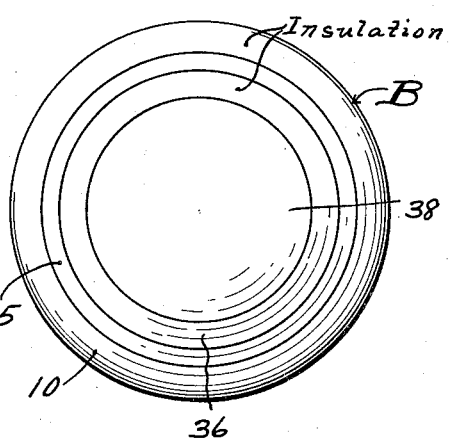
Inventor
C. F. Truswell
By Watson E. Coleman
Attorney Patented Nov. 5, 1935

2,020,088

UNITED STATES PATENT OFFICE 2,020,088

UNIVERSAL SWIVELED COUPLING FOR ELECTRICAL CONDUCTORS

Charles F. Truswell, Detroit, Mich., assignor of one-half to Florence L. Condon, Detroit, Mich.

Application March 20, 1934, Serial No. 716,534

5 Claims. (Cl. 173—324)

This invention relates to couplings for connecting electric conductors and particularly to couplings having a flexible connection to each other.

The principal object of my invention is to provide a universal or swivel type coupling of this character which is particularly adapted to be used with household appliances or which may be incorporated into or used in connection with all electrical machines or appliances where the appliances are handled and shifted from place to place during usage and which is so constructed as to avoid wear and tear upon the conductors and thereby reduce the danger of leaks developing in the insulation thereof and either subjecting the users to shocks or causing short circuits and possibly fires.

It is a further object of the invention to provide a coupling of this type which is so constructed as to prevent arcing of the contact members thereof, thus preventing the likelihood of blowing fuses and causing delays in the supply of current.

A further object is to provide a construction of this character in which two elements are used, one in the form of a socket and the other in the form of a ball, the ball and socket being axially rotatable with relation to each other and also capable of being angled with relation to each other in any direction, and a further object is to provide a construction of this character which is particularly adapted to be used on 110 v. to 220 v. circuits and either for two wire or one wire circuits.

Other objects will appear in the course of the following description.

My invention is illustrated in the accompanying drawings, wherein:—

Figure 1 is an elevation of my universal swiveled coupling showing it swung in dotted lines;

Figure 2 is a section on the line 2—2 of Figure 1;

Figure 3 is an elevation of one of the elements of the coupling;

Figure 4 is a vertical section through the coupling taken on the line 4—4 of Figure 1;

Figure 5 is a top plan view of the insulating washer;

Figure 6 is a top plan view of the ball element of the coupling.

Referring to these drawings, it will be seen that my coupling is formed of two coupling elements A and B, both of these elements being of insulation. The element B is in the form of a ball 10 having a neck 11 preferably screw-threaded at 12 and having thereon the collar or flange 13 for a purpose to be later stated. The coupling element A is illustrated as cylindrical in form and at one end fits into a metallic sleeve 14, the lower margin of which is inwardly bent or curved as at 15 to extend around the ball 10 below a plane extending through the center of the ball. The element A is preferably formed with pins 16 while the sleeve 14 is provided with bayonet joint slots 17 into which these pins are adapted to be inserted, a rotation of the sleeve with reference to the element A causing the locking of the sleeve to the element A. The element A as shown is preferably formed in two sections held together by screws 18. I do not wish to be limited to this, however.

The element A adjacent its upper end is formed with a chamber 19 which is enlarged at its upper end but extends axially through the element A to the lower end thereof, that is, the end adjacent the element B. A neck 20 opens from the upper end of the element A into this chamber 19 so that a two wire conductor designated generally 21 with its insulation may be inserted in this neck.

Disposed within the lower portion of the chamber 19 is a hollow cylindrical conductor 22 shown in detail in Figure 3 which terminates at its lower end in an outwardly extending disk 23 reset into a recess in the lower end of the element A. The upper end of the conductor 22 carries a binding screw 24 to which one of the wires 25 of the conductor 21 may be engaged.

Disposed within the interior of the hollow conductor 22 is an insulating sleeve 26 which extends down below the disk 23 and disposed within this sleeve is a conducting member 27 having a binding screw 28 at its upper end with which the other wire 29 of the conductor 21 may be engaged. The conducting member 27 is hollow and disposed within the interior of the conducting member is a coiled spring 30 which engages at its lower end around a metallic stem 31 having at its lower end a contacting surface adapted to contact with a metallic insert in the ball 10 as will be now described.

The ball B has a flat upper surface 32 and a central bore 33 extending out through the neck and opening at its upper end upon this flat surface 32. The upper end of this bore is enlarged and inserted in this enlarged upper end is the neck 34 of a disk-like contact member 35. The under face of this disk 35 rests upon the flat face 32 of the ball and the edge of the disk-like member is beveled or rounded to conform to the curvature of the ball 10.

Adapted to rest upon the disk 35 is an insulating washer 36 having a downwardly extending annular flange 37 or neck which fits within the neck 34 of the disk 35. Disposed upon the insulating washer 36 is a metal contact member 38 whose outer face is rounded to conform to the curvature of the ball 10 and the curvature given to the periphery of the disk 35 and the periphery of the insulating washer 36. This contact member 38 has a downwardly extending centrally disposed hub 39 which fits within the annular flange 37 of the insulating disk. The contact member 31 has its upper face concavely curved to conform to the convex curvature of the contact element 38 and to have electrical engagement with this contact element at all times.

Disposed between the ball 10 and the lower end of the element A is an annular insulating disk 40 and supporting this disk is an approximately cylindrical metallic shell constituting a conductor and designated 41. This shell supports upon it the annular washer or disk 40, the disk being held to the shell by means of the screws 42. These screws also hold in place a plurality of spring contacts 43 which extend upward and laterally as shown in Figure 5 and bear elastically against the under face of the contact disk 23. These spring fingers also act to force the shell 41 downward. The lower edge of the shell 41 is beveled or curved to fit against the beveled periphery of the disk 35 and the diameter of the shell 41 is the same as the diameter of the disk 35. Thus in all positions of the ball B, some portion of the shell 41 will bear against the disk 35. If the elements A and B are in axial alinement with each other, shell 41 will bear against and have electrical contact with the whole periphery of the disk 35. If on the other hand, the element A is canted with reference to the vertical axis of the element B, opposite points on the shell 41 will engage with the periphery of the disk 35.

The hub 39 of the contact element 38 is formed with a recess for the reception of the wire 44 of the conductor 45 which leads out through the central passage in the ball. Disposed within this central passage and surrounding the insulated conductor 45 is a metallic sleeve 46 which has screw-threaded engagement with the hub 34 of disk 35. The lower end of this sleeve 46 is flanged as at 47 and extends beneath the lower end of the neck 11. Thus the bared end of the wire of a conductor 48 may be inserted between the flange 47 and the lower end of the neck 11 and clamped in this position, the wires 44 and 48 being then carried to any appliance in an obvious manner.

The screw-threads 12 on the lower end of the neck 11 provide for the connection of this coupling to any supply socket or unit the coupling is used with and the neck 11 can be made either as shown or formed for the reception of a plug or female thread depending upon what form of connection is desired. The flange 13 limits the extent to which an element may be screwed on to the threads 12 and thus prevents the element from impeding the full movement of the ball 10.

It will be seen that with the two wire connection shown, the current passes through the wire 25 to the metallic element 22 and the disk 23 and hence by spring contacts 43 to the shell 41 and hence to the disk 35, its neck 34, the sleeve 46, to the conductor 48. From the wire 29, current passes to the set screw 28 through the conductor 27 and spring 30 to the contact member 31, thence to the metallic insert 38 and thence by wire 44 out of the ball.

It will be seen that the spring 30 urges the contact 31 at all times into electrical engagement with the metallic insert or contact 38 and that this occurs in all positions of the ball with reference to the element A. It will also be seen that the spring contacts 43 bear yieldingly at all times against the disk 23 and urge the conducting shell 41 down into electrical engagement with the periphery of the disk 35.

In assembling this coupling, the neck 34 of the disk 35 is inserted within the ball 10. The tubular conductor 46 is then screwed in from the bottom and the wire 48 is attached. The insulating washer 36 is then pressed into place and the wire 44 is attached as by soldering or otherwise to the lower end of the hub 39 of contact member 38. This wire 44 is threaded downward through the sleeve 46 and the contact element 38 put into place. The springs 43 are then attached to the disk 40, the screws 42 being engaged with the shell 41. The unit thus formed is placed on top of the ball 10 and the connecting shell or sleeve 14 is then brought up over the bottom of the ball. The element A which is made of bakelite or other suitable insulating material is then separated into its two halves or sections. The conducting element 22 is then put in place and then the sleeve 26 is inserted and then the conducting element 27 inserted. All these fit tightly into one-half of the chamber 19. The spring 30 is then inserted and the plunger-like contact 31 put in place. The wires 25 and 29 are then connected to the screws 24 and 28 respectively. The two halves of the element A are put together after knots have been made in the conductors, the enlarged portion of the chamber 19 being made for this purpose, and the two sections of the element A are then bolted together by the bolts 18. The assembled section A is then put into the sleeve 14 and interlocked therewith by the bayonet joints formed by the pins and slots 16.

It will be seen that with this construction, the elements A and B act as one coupling unit, permitting the two parts of the coupling unit to bend and twist into any position. The two elements have free action in any direction and at the same time a complete and uninterrupted contact is secured in all positions or during any movement.

One of the advantages of this invention resides in the ease with which the parts may be disassembled. Because the element A is cylindrical at its lower portion and the sleeve 14 is cylindrical, this sleeve, which constitutes the socket for the ball 10, can be readily removed. When the sleeve is removed from its engagement with the element A, the ball comes out and either the annular member 41 and the disk 40 with fingers 43 will come out with the ball, when the sleeve is removed, or they may be forced out. Thus, if the sleeve is removed from the element A, the ball 10, the annular member 41, with the insulating washer 40, may be all removed from the interior of the sleeve. By reason of the fact that the conducting element 46 extending through the ball is tubular, it is an easy matter to force the metallic insert 38 with its shank 39 from the ball to permit the conductor 45 to be engaged with the shank 39. Thus, it is obvious that the parts 46 and 39 may be readily wired and that full access is given to these parts. When the sleeve is removed from the element A, then this element A may be separated into its two half sections by releasing the screws 18 and thus complete access is had to the conducting tube 22 and the central conducting member 28 so that the wires 25 and 29 may be engaged with these two conducting parts 22 and 27. These parts 22, 27, and 26, with disk 23, may be readily withdrawn from one of the half sections of the element A so that the parts may be repaired or replaced if desired. The insulating disk 40 bears at its edge against the sleeve 14 and thus acts to center the annular conducting member 41 and acts to hold this conducting member 41 out of contact with the shell or sleeve 14, while eliminating the necessity of packing non-conductive material between the periphery of the annular member 41 and the shell or sleeve 14, the frictional resistance of which against the shell would render it somewhat difficult to remove the annular member 41 from the interior of the sleeve. The fingers 43 being resilient and bearing against the disk 23 act to urge the member 41 downward into close contact with disk 35, while the spring 30 not only acts to urge the contact member 31 downward into contact with the contacting member 38, but also acts to conduct current to this contact member 31 in case there should be any wear between the contact member and the sleeve 27 which should tend to break the circuit.

Though I have illustrated and described herein a construction which uses two wires, it is obvious that the device may be modified without invention to accommodate a one wire arrangement by using the center contact only.

Preferably I will use "Bakelite" for the insulating material and brass for the metallic parts, though I do not wish to be limited thereto. Neither do I wish to be limited to the exact construction illustrated as many minor changes might be made therein without departing from the spirit of the invention as defined in the appended claims.

I claim:—

1. A universal coupling for electric wires including two complemental elements of insulating material, one of said elements being in the form of a ball, the other element being cylindrical and having a hollow interior, a sleeve detachably engaged with the last named element and constituting a socket for the reception of the ball, the sleeve embracing the ball below its center whereby to permit oscillation of the ball in all directions, a central contact member inset into the ball and having a convex face confronting the cylindrical coupling element, a contact disk inset into the ball and having its periphery exposed upon the face of the ball and conforming in curvature thereto, means for connecting the central contact member and the contact disk to conductors leading from the ball, an annular contact disk mounted on the lower face of the cylindrical element, a central contact carried by the cylindrical element and resiliently urged into engagement with the central contact of the ball, means for connecting the contact members on the cylindrical element to conducting wires, a cylindrical metallic shell constituting a conducting member disposed between the ball and the opposed coupling element and disposed within the sleeve, the lower edge of the conducting member having the same diameter as and bearing against the peripheral edge of the contact disk in the ball, and spring fingers carried by the conducting member and bearing against the annular contact disk in the cylindrical element, and means insulating the cylindrical conducting member from the sleeve and holding the conducting member centered within the sleeve.

2. A universal coupling for electric wires including complemental coupling elements of insulating material, one in the form of a ball, a sleeve detachably engaged with the other coupling element constituting a socket and embracing the ball, a centrally disposed contact member inserted in the end of the ball confronting the other element and having a convexly curved outer face, a contact disk carried by the ball and having its periphery exposed upon the surface of the ball but insulated from the first named contact member, a central contact carried by the opposed coupling element and resiliently urged toward the central contact on the ball, an annular conducting element having the same diameter as the disk and having its lower edge conforming to the edge of the disk, the annular conducting element being disposed between the ball and the opposed coupling element and within the sleeve, an annular disk of insulating material fitting within the sleeve and to which said annular conducting member is attached, spring contacts disposed on said insulating disk and electrically engaged with the annular conducting element, a metallic disk carried by the element opposed to the ball and against which the spring contacts bear, and means for connecting the conducting elements in the ball and in the opposed coupling member with opposed conductors.

3. A universal coupling for electric wires including two complemental coupling elements of insulating material, one in the form of a ball, the other being formed of two sections and being cylindrical, a sleeve embracing and detachably engaged with the last named coupling element and extending down around and embracing the ball, a centrally disposed contact member inserted in the end of the ball and having a convexly curved outer face, a contact disk carried by the ball insulated from the first named contact member and having its periphery exposed upon the surface of the ball, a disk of insulating material disposed within the sleeve and below the cylindrical coupling element, an annular conducting element connected to said disk and having its edge at all times bearing against the annular disk on the ball, spring fingers attached to the insulating disk and electrically engaged with the annular contact member carried thereby, the cylindrical coupling element having a resiliently projected contact member engaging the central contact member on the ball, and an annular disk-shaped conducting member disposed within the cylindrical coupling member and concentric to and insulated from the central contact member thereof and against which the spring fingers bear, means for connecting the central contact member and the last named disk to conducting wires, and means for connecting the central contact member on the ball and the annular disk thereon to conducting wires.

4. A universal coupling for electric wires including two complemental elements of insulating material, one a cylindrical body and the other a ball; a cylindrical sleeve detachably connected to and extending from the body contracted at its end remote from the body and forming a socket within which the ball is disposed; the ball having a central contact member provided with a convex face, a second contact member spaced from the central contact and imbedded in said ball and having its periphery exposed on the face of the ball; metallic conductors leading through the ball to these contacts; the cylindrical body having a central resiliently projected contact member engaging with the central contact on the ball; an annular contact member disposed within the sleeve and between the body and the ball and engaging against the edge face of the annular contact on the ball; means insulating the annular contact member between the body and the ball from the sleeve and centering it therein; spring fingers electrically engaging the last named contact member and projecting toward the body; a disk-like contact carried by the body and with which the fingers electrically engage and insulated from the central contact on the body; and conducting elements extending through the body from the said last named contacts.

5. A universal coupling for electric wires including two complemental elements of insulating material, one a cylindrical body and the other a ball, the cylindrical body being disposed of two lateral complementary sections of insulating material; a cylindrical sleeve detachably engaging the sections of the body and forming a socket for the ball, the sleeve having a contracted neck; the ball having a central convexly curved contact and spaced from this central contact having an annular contact, the periphery of which is exposed upon the face of the ball; a tubular conductor leading from the last named contact entirely through the ball and opening upon the exterior end thereof; the two sections of the body having mating, longitudinally extending recesses; a tubular conductor disposed in said recesses and terminating at its inner end in a disk, a central tubular conductor disposed within but insulated from the first named tubular conductor; a contact member having a shank disposed in the bore of the last named conductor; a spring disposed in said bore and urging the contact member into engagement with the central contact on the ball; an annular contact member disposed between the body and the ball and engaging the second named contact member on the ball, means insulating the annular contact member from the sleeve and holding it centered with relation thereto, and spring fingers electrically engaging the annular contact member and bearing against the disk-like element on the confronting end of the body.

CHARLES F. TRUSWELL.